(12) United States Patent
Kikuchi

(10) Patent No.: US 12,395,598 B2
(45) Date of Patent: Aug. 19, 2025

(54) STORAGE MEDIUM, INFORMATION PROCESSING APPARATUS, AND CONTROL METHOD FOR INFORMATION PROCESSING APPARATUS

(71) Applicant: CANON KABUSHIKI KAISHA, Tokyo (JP)

(72) Inventor: Hiroshi Kikuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/581,711

(22) Filed: Feb. 20, 2024

(65) Prior Publication Data
US 2024/0283885 A1 Aug. 22, 2024

(30) Foreign Application Priority Data

Feb. 22, 2023 (JP) .................................. 2023-025960

(51) Int. Cl.
*H04N 1/34* (2006.01)
(52) U.S. Cl.
CPC .................................. *H04N 1/346* (2013.01)
(58) Field of Classification Search
CPC ....................................................... H04N 1/346
USPC ................................................. 358/1.1–1.18
See application file for complete search history.

(56) References Cited

U.S. PATENT DOCUMENTS

| 2010/0079800 A1* | 4/2010 | Muto ..................... G06F 3/1259 |
| | | 358/1.15 |
| 2011/0051168 A1* | 3/2011 | Shibata .............. G03G 15/5091 |
| | | 358/1.13 |
| 2017/0277490 A1* | 9/2017 | Sun ........................ G06F 3/1285 |
| 2023/0019647 A1* | 1/2023 | Yamada ................ G06F 3/1285 |
| 2024/0256191 A1* | 8/2024 | Ishii ....................... G06F 3/1253 |

FOREIGN PATENT DOCUMENTS

| JP | 2006221262 A | | 8/2006 |
| JP | 2011060003 A | * | 3/2011 |

* cited by examiner

*Primary Examiner* — Gabriel I Garcia

(74) *Attorney, Agent, or Firm* — ROSSI, KIMMS & McDOWELL LLP

(57) ABSTRACT

A non-transitory computer-readable storage medium storing a program for causing a computer to execute a control method for an information processing apparatus that transmits a print job, which causes to execute a print processing according to an instruction, to an image forming apparatus, the control method including a step of obtaining a total number of already-printed pages including the number of pages already printed to date, and a step of, in a case that a sum of the total number of already-printed pages and the number of pages included in the instruction exceeds a threshold value corresponding to a contracted plan, causing a display unit of the information processing apparatus to display a user interface including a first object for instructing to transmit a print job that causes to execute a print processing exceeding the threshold value, and a second object for instructing to cancel transmitting the print job.

12 Claims, 16 Drawing Sheets

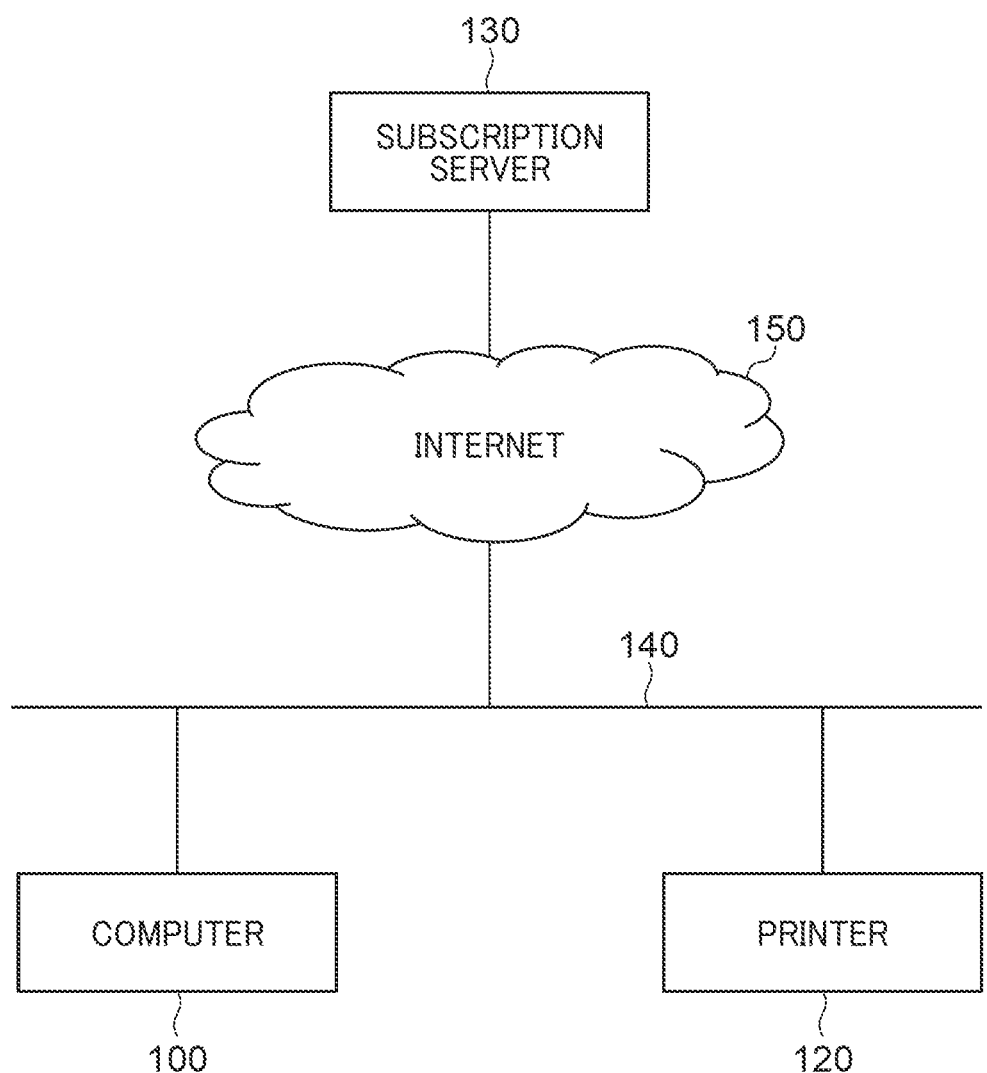

*FIG. 4*

| PLAN NAME | MAXIMUM NUMBER OF PAGES | FEE |
|---|---|---|
| PLAN 1 | 10 PAGES/MONTH | 1500 YEN/MONTH |
| PLAN 2 | 100 PAGES/MONTH | 2000 YEN/MONTH |
| PLAN 3 | 500 PAGES/MONTH | 3000 YEN/MONTH |
| PLAN 4 | 1000 PAGES/MONTH | 5000 YEN/MONTH |

*FIG. 11*

| PLAN | MAXIMUM NUMBER OF PAGES | FEE | ADDITIONAL FEE FOR EXCEEDING MAXIMUM NUMBER OF PAGES |
|---|---|---|---|
| PLAN A | 10 PAGES/MONTH | 1500 YEN/MONTH | 150 YEN/10 PAGES |
| PLAN B | 100 PAGES/MONTH | 2000 YEN/MONTH | 150 YEN/10 PAGES |
| PLAN C | 500 PAGES/MONTH | 3000 YEN/MONTH | 150 YEN/10 PAGES |
| PLAN D | 1000 PAGES/MONTH | 5000 YEN/MONTH | 150 YEN/10 PAGES |

STORAGE MEDIUM, INFORMATION PROCESSING APPARATUS, AND CONTROL METHOD FOR INFORMATION PROCESSING APPARATUS

BACKGROUND OF THE INVENTION

Field of the Invention

The present invention relates to a storage medium, an information processing apparatus, and a control method for the information processing apparatus.

Description of the Related Art

In recent years, due to the reduction of initial investment in offices and ease of budget management, an increasing number of people are using a fixed-rate plan (a subscription) for a printer (including office equipment having a printer function such as a multifunction peripheral (an MFP)). In the subscription for the printer, for example, by paying a fixed monthly fee, a user is able to print up to a predetermined maximum number of pages without paying an additional fee. In addition, there are several plans for the maximum number of pages, so the user is able to select a desired plan from the several plans by using, for example, the average number of printed pages per month as an index.

However, in the case that the user needs to print more than the maximum number of pages for a plan under contract (hereinafter, referred to as "a current plan"), the plan under contract (the current plan) is often accompanied with a contract that automatically shifts the current plan to the next plan with a higher maximum number of pages than that of the current plan or a contract that an additional fee will apply depending on the number of excess pages.

On the other hand, the number of printed pages is managed so that the number of printed pages does not exceed the maximum number of pages. Japanese Laid-Open Patent Publication (kokai) No. 2006-221262 has disclosed a configuration (a technique) that allows the user to select whether to cancel printing or to change to a print setting, which does not exceed the maximum number of pages, in the case of becoming printing exceeding the maximum number of pages when printing is instructed from a computer.

However, the user may want to perform printing even in the case that automatically shifting of the plan under contract to the next plan is performed or the user has to bear expenses (pay the additional fee) depending on the number of excess pages. However, in the case of using the technique (the configuration) disclosed in Japanese Laid-Open Patent Publication (kokai) No. 2006-221262, the user is not able to perform the printing exceeding the maximum number of pages (the user is not able to print more than the maximum number of pages).

SUMMARY OF THE INVENTION

The present invention provides a mechanism capable of answering a need to print more than the maximum number of pages in a current plan even by allowing changing from the current plan to the next plan or applying of an additional fee for exceeding the number of printed pages.

Accordingly, the present invention provides a non-transitory computer-readable storage medium storing a program for causing a computer to execute a control method for an information processing apparatus that transmits a print job, which causes to execute a print processing according to an instruction issued by a user, to an image forming apparatus, which restricts the number of printed pages based on a contracted plan, the control method comprising a step of obtaining a total number of already-printed pages including the number of pages already printed to date by the image forming apparatus, and a step of, in a case that a sum of the total number of already-printed pages and the number of pages included in the instruction exceeds a threshold value corresponding to the contracted plan, causing a display unit of the information processing apparatus to display a user interface including a first object for instructing to transmit a print job that causes the image forming apparatus to execute a print processing exceeding the threshold value, and a second object for instructing to cancel transmitting the print job to the image forming apparatus.

According to the present invention, it is possible to answer the need to print more than the maximum number of pages in the current plan even by allowing changing from the current plan to the next plan or applying of the additional fee for exceeding the number of printed pages.

Further features of the present invention will become apparent from the following description of exemplary embodiments with reference to the attached drawings.

BRIEF DESCRIPTION OF THE DRAWINGS

FIG. 1 is a diagram that shows a schematic configuration of a printing system including a computer functioning as an information processing apparatus according to a preferred embodiment of the present invention.

FIG. 4 is a diagram that shows an example of a subscription plan for the printer in a first embodiment.

FIG. 11 is a diagram that shows an example of a subscription plan for the printer in a second embodiment.

DESCRIPTION OF THE EMBODIMENTS

Figure 2A:
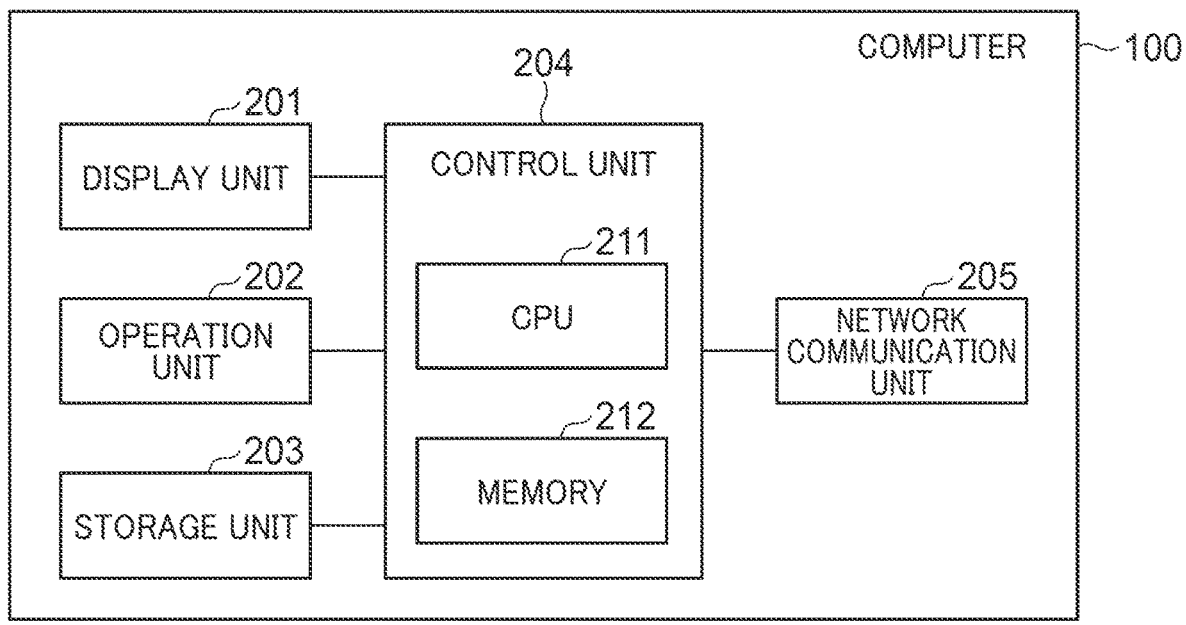
FIGS. 2A, 2B, and 2C are block diagrams that show hardware configurations of the computer, a subscription server, and a printer that constitute the printing system shown in FIG. 1.

The present invention will now be described in detail below with reference to the accompanying drawings showing embodiments thereof.

Hereinafter, preferred embodiments of the present invention will be described in detail with reference to the accompanying drawings.

FIG. 1 is a diagram that shows a schematic configuration of a printing system including a computer 100 functioning as an information processing apparatus according to a preferred embodiment of the present invention. The configuration of the printing system is common to a first embodiment and a second embodiment, which will be described below. As shown in FIG. 1, the printing system includes a subscription server 130, the computer 100 functioning as the information processing apparatus, and a printer 120 functioning as an image forming apparatus. The computer 100 and printer 120 are installed in, for example, an office, and are communicably connected to each other via an in-house network 140. The in-house network 140 is connected to the Internet 150 via a router (not shown). It should be noted that the in-house network 140 is, for example, a local area network (a LAN), but it does not matter whether it is a wired connection or a wireless connection.

The subscription server 130 is a server that provides a printer subscription service, is managed by a printer subscription provider, and is connected to the Internet 150. In this way, the subscription server 130 is communicably connected to the computer 100 and the printer 120 via the Internet 150 and the in-house network 140. It should be noted that regarding the use of the printer 120, it is assumed that a contract under any one of plans 1 to 4 and A to D described below has been concluded between a user of the printer 120 and the printer subscription provider.

FIG. 2A is a block diagram that shows a hardware configuration of the computer 100. As shown in FIG. 2A, the computer 100 includes a display unit 201, an operation unit 202, a storage unit 203, a control unit 204, and a network communication unit 205, and the control unit 204 includes a central processing unit (a CPU) 211 and a memory 212.

The display unit 201 is a display device such as a liquid crystal display (an LCD). The operation unit 202 is an input device including, for example, a mouse and a keyboard that accept operations performed by the user. The storage unit 203 is a storage medium such as a hard disk drive (an HDD) or a solid state drive (an SSD), and stores various kinds of software necessary for the operations of the computer 100.

The control unit 204 performs overall control of the computer 100 by causing the CPU 211 to execute predetermined programs stored in the memory 212 and the storage unit 203. In addition, the control unit 204 causes the CPU 211 to load a predetermined software program stored in the storage unit 203 into the memory 212, thereby executing various kinds of processing, which will be described below. The network communication unit 205 is connected to an external network such as the Internet 150 via the in-house network 140, and performs input/output of data from/to external apparatuses.

Figure 2B:
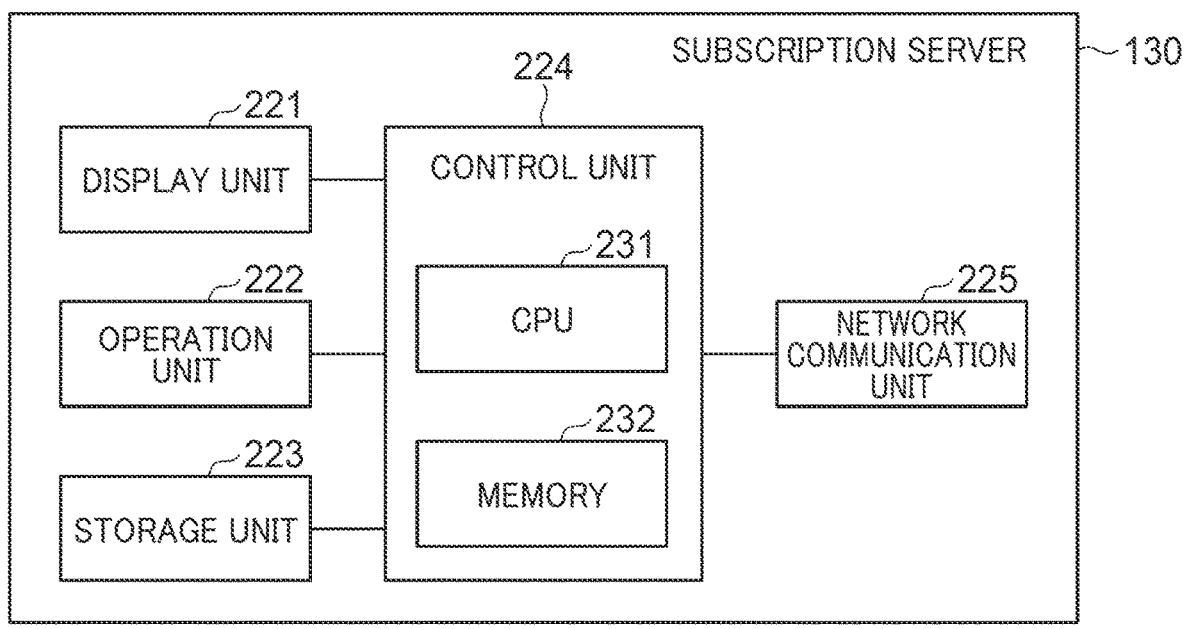

FIG. 2B is a block diagram that shows a hardware configuration of the subscription server 130. As shown in FIG. 2B, the subscription server 130 includes a display unit 221, an operation unit 222, a storage unit 223, a control unit 224, and a network communication unit 225, and the control unit 224 includes a CPU 231 and a memory 232.

Although the subscription server 130 and the computer 100 execute different programs (different processing), they have almost the same hardware configuration. Therefore, the description of the hardware configuration of the subscription server 130 is similar to the description of the hardware configuration of the computer 100, and the description of the hardware configuration of the subscription server 130 will be omitted here.

Figure 2C:
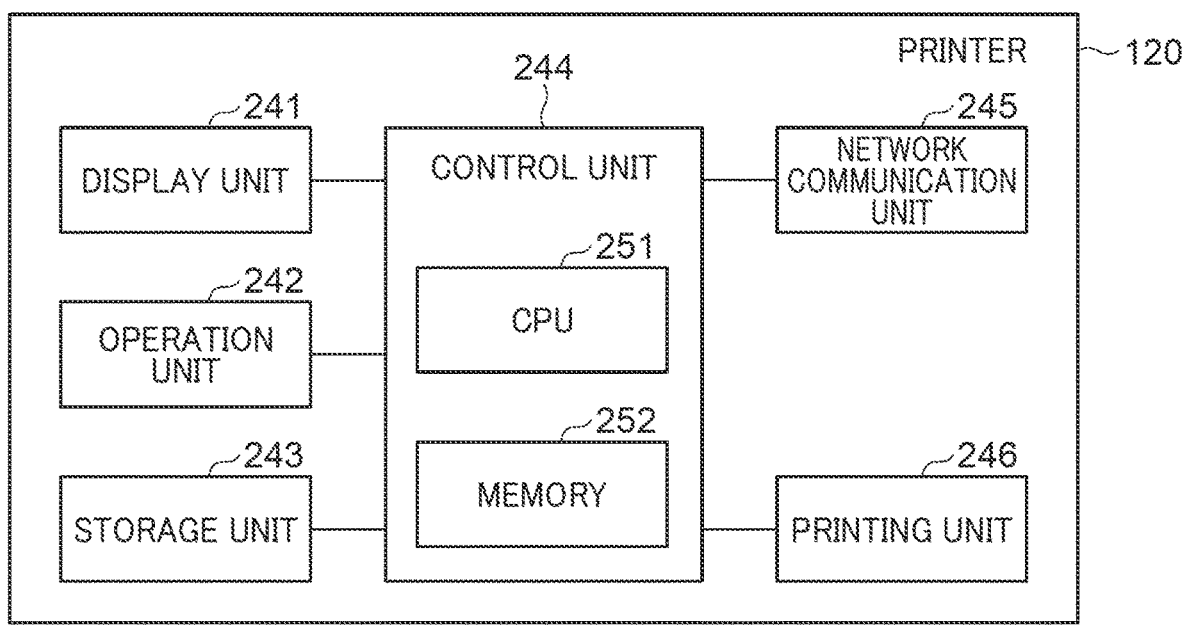

FIG. 2C is a block diagram that shows a hardware configuration of the printer 120. As shown in FIG. 2C, the printer 120 includes a display unit 241, an operation unit 242, a storage unit 243, a control unit 244, a network communication unit 245, and a printing unit 246, and the control unit 244 includes a CPU 251 and a memory 252.

The display unit 241 is a display device such as an LCD. The operation unit 242 is an input means including, for example, a touch panel, buttons, switches, and the like that accept operations performed by the user. The touch panel is disposed to overlap a display panel of the display device, and the touch panel and the display device cooperate to function as an operation means for accepting user operations. The storage unit 243 is a storage medium such as an HDD or an SSD, and stores various kinds of software necessary for the operations of the printer 120.

The control unit 244 performs overall control of the printer 120 by causing the CPU 251 to execute predetermined programs stored in the memory 252 and the storage unit 243. In addition, the control unit 244 causes the CPU 251 to load a predetermined software program stored in the storage unit 243 into the memory 252, thereby executing various kinds of processing, which will be described below.

The network communication unit 245 is connected to the external network such as the Internet 150 via the in-house network 140, and performs input/output of data from/to the external apparatuses. The printing unit 246 converts digital data stored in the storage unit 243 or the memory 252 into an image according to an instruction from the control unit 244, and prints the image on recording sheets (printing sheets). The printing method is not limited, and for example, an inkjet method or an electrophotographic method may be used.

Figure 3:
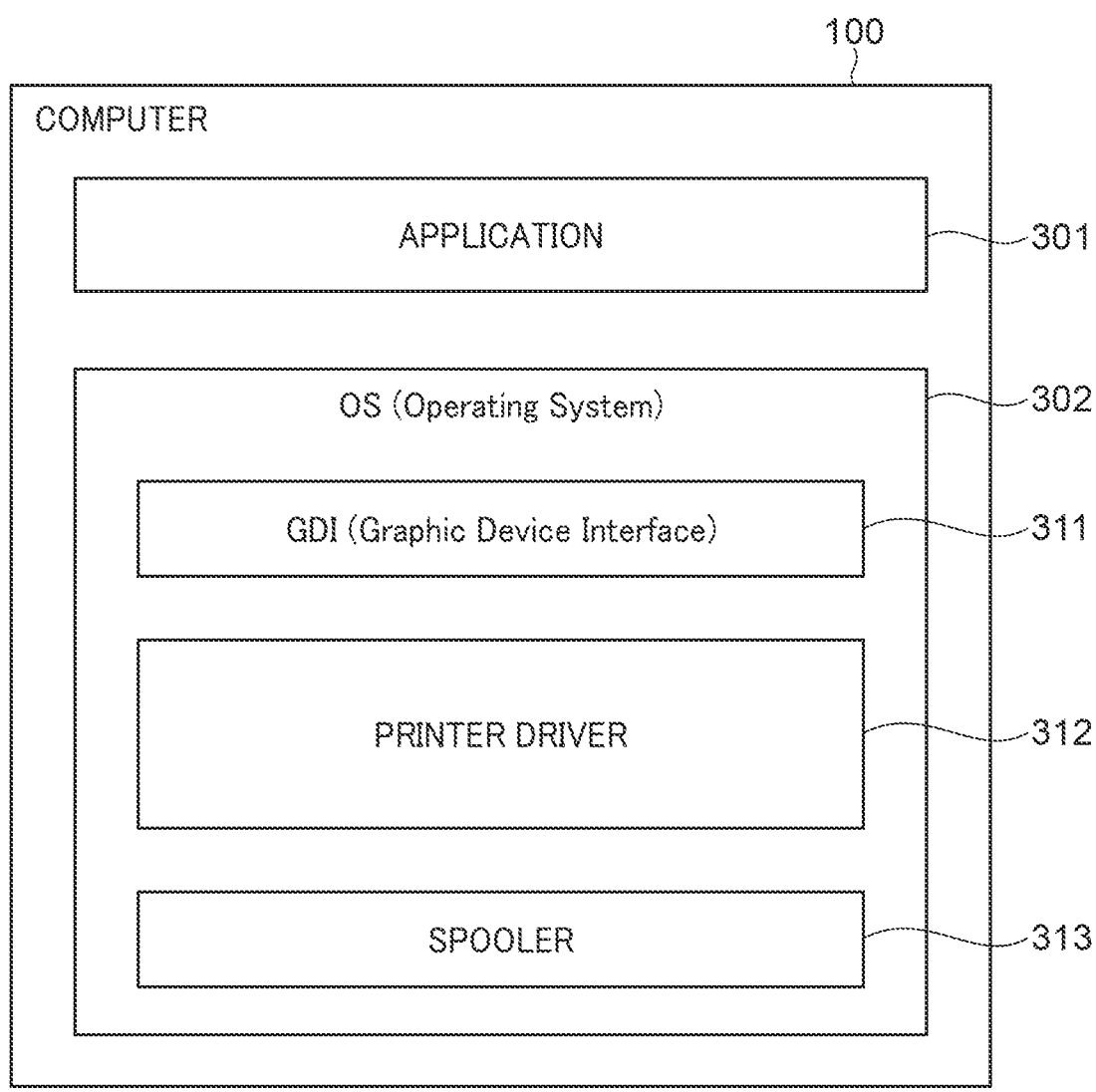
FIG. 3 is a block diagram that shows a configuration of print-related software of the computer.

FIG. 3 is a block diagram that shows a configuration of print-related software of the computer 100. As shown in FIG. 3, the print-related software includes an application 301 and an operating system (an OS) 302. In addition, the OS 302 includes a graphic device interface (a GDI) 311, a printer driver 312, and a spooler 313. The application 301 refers to any software such as document creation software, spreadsheet software, or image editing software, and is assumed to include a printing function. By executing the printing function included in the application 301, the user is able to print information and the like displayed on the display unit 201 of the computer 100 by using the printer 120. The printing function included in the application 301 is realized by calling an interface provided by the GDI 311 out.

The OS 302 is software that controls the basic operations of the computer 100. The application 301 and the printer driver 312 are managed by the OS 302, and become usable by being installed on the OS 302. The GDI 311 is a component that provides an interface related to rendering such as printing to the external apparatus. The printer driver 312 displays print settings for performing printing with the printer 120 on the display unit 201, and also generates rendering data (page description language (PDL)) that can be interpreted by the printer 120 during printing. The spooler 313 transmits the PDL generated by the printer driver 312 to the printer 120.

The above description is a description of the configuration common to the first embodiment and the second embodiment, which will be described below.

First, the first embodiment will be described. FIG. 4 is a plan table that shows an example of a subscription plan for the printer 120 in the first embodiment. As shown in FIG. 4, the plans 1, 2, 3, and 4 are available as the subscription plan. The maximum number of pages for the plan 1 is 10 pages per month, and the monthly fee is 1,500 yen. For the plans 2 to 4 as well, the maximum number of pages per month (the monthly maximum number of pages) and the monthly fee are determined as shown in FIG. 4. It should be noted that the maximum number of pages indicates a threshold value for the number of printed pages per month determined for each plan. In the case that the user has subscribed to the subscription plan shown in FIG. 4, when printing exceeding the maximum number of pages is performed, it is assumed that automatically shifting to the plan with the next highest monthly maximum number of pages is performed.

It is desirable for the user to perform printing within the maximum number of pages in his/her contracted plan (a current plan), but in the case of exceeding the maximum number of pages, since his/her contracted plan shifts to the plan with the next highest maximum number of pages (a new plan), the user will need to pay the monthly fee for the new plan.

Figure 5:
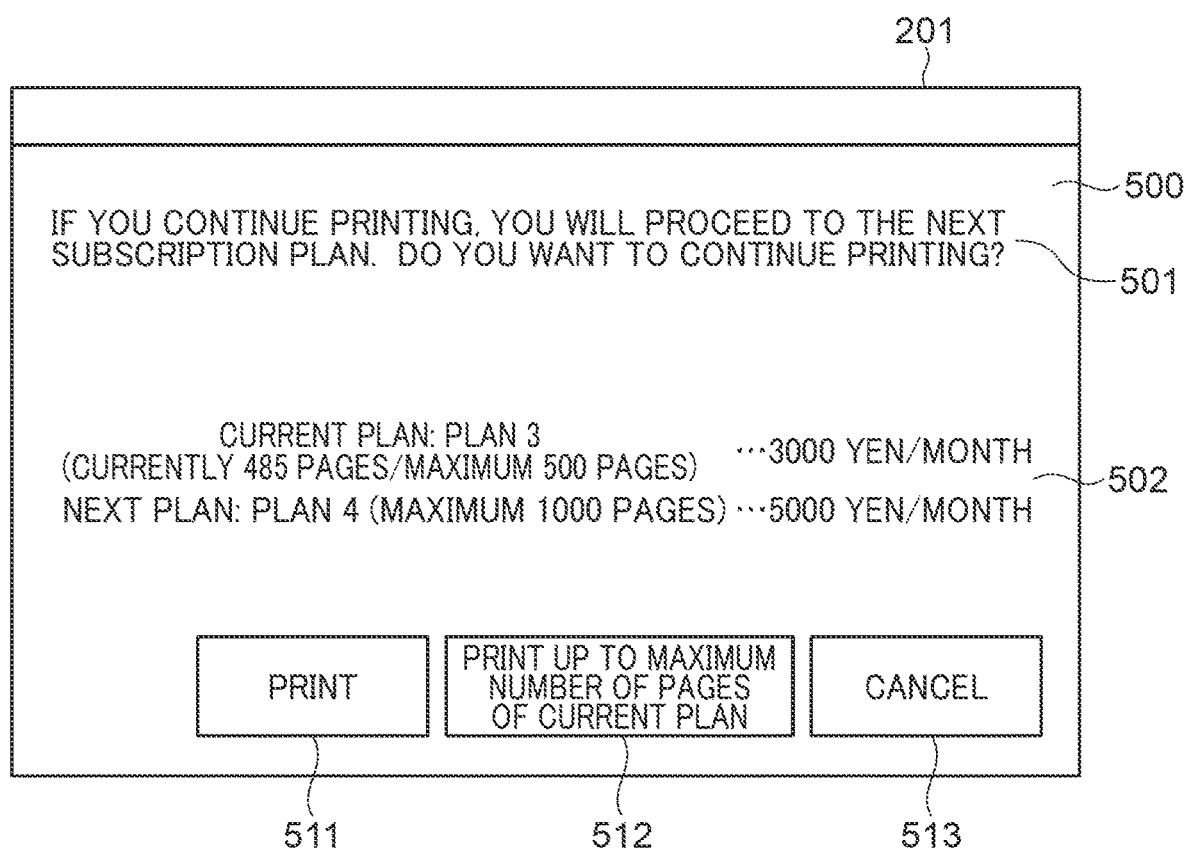
FIG. 5 is a diagram that shows an example of a user interface (a UI) displayed on a display unit of the computer in the first embodiment.

FIG. 5 is a diagram that shows a user interface (hereinafter, referred to as "a UI") 500 displayed on the display unit 201 by the printer driver 312 in the case that in the first embodiment, when printing of the number of all pages in a print job is performed, the number of all pages in the print job will exceed the maximum number of pages for the current plan.

The UI 500 includes an explanation 501 that calls attention to the fact that if you perform printing with the current settings, your contracted plan will be shifted to the next subscription plan, plan information 502 for the current plan and the next plan, a print button 511, a limited print button 512, and a cancel button 513. In addition, the print button 511, the limited print button 512, and the cancel button 513 accept a selection from the user. It should be noted that the current plan is a plan that is currently under contract. In addition, the next plan is a plan that will be applied by automatic shifting in the case that printing exceeding the maximum number of pages of the current plan is performed, and is a plan with less restriction on the number of printed pages than the current plan. In the case of the plan table shown in FIG. 4, it is assumed that the plan 1 is shifted to the plan 2, the plan 2 is shifted to the plan 3, and the plan 3 is shifted to the plan 4.

The plan information 502 represents a plan name, the maximum number of pages, and a fee that are shown in FIG. 4, and the number of pages printed to date (more precisely, "a total number of already-printed pages", which will be described below). The print button 511 is a button for instructing to perform printing after allowing the shifting from the current plan to the next plan, that is, a button for instructing to transmit a print job that causes the printer 120 to execute printing exceeding the maximum number of pages (the threshold value). The limited print button 512 is a button for instructing to perform printing up to the maximum number of pages of the current plan without allowing the shifting from the current plan to the next plan. In other words, the limited print button 512 is a button for instructing to transmit a print job that causes the printer 120 to execute printing of a predetermined number of pages among all pages included in an instruction received from the user. It should be noted that a sum of the predetermined number of pages and the total number of already-printed pages described below matches the maximum number of pages. The cancel button 513 is a button for instructing to cancel transmitting the print job to the printer 120. Selection from the print button 511, the limited print button 512, and the cancel button 513 can be made by using any one of the mouse and the keyboard that constitute the operation unit 202.

Figure 6:
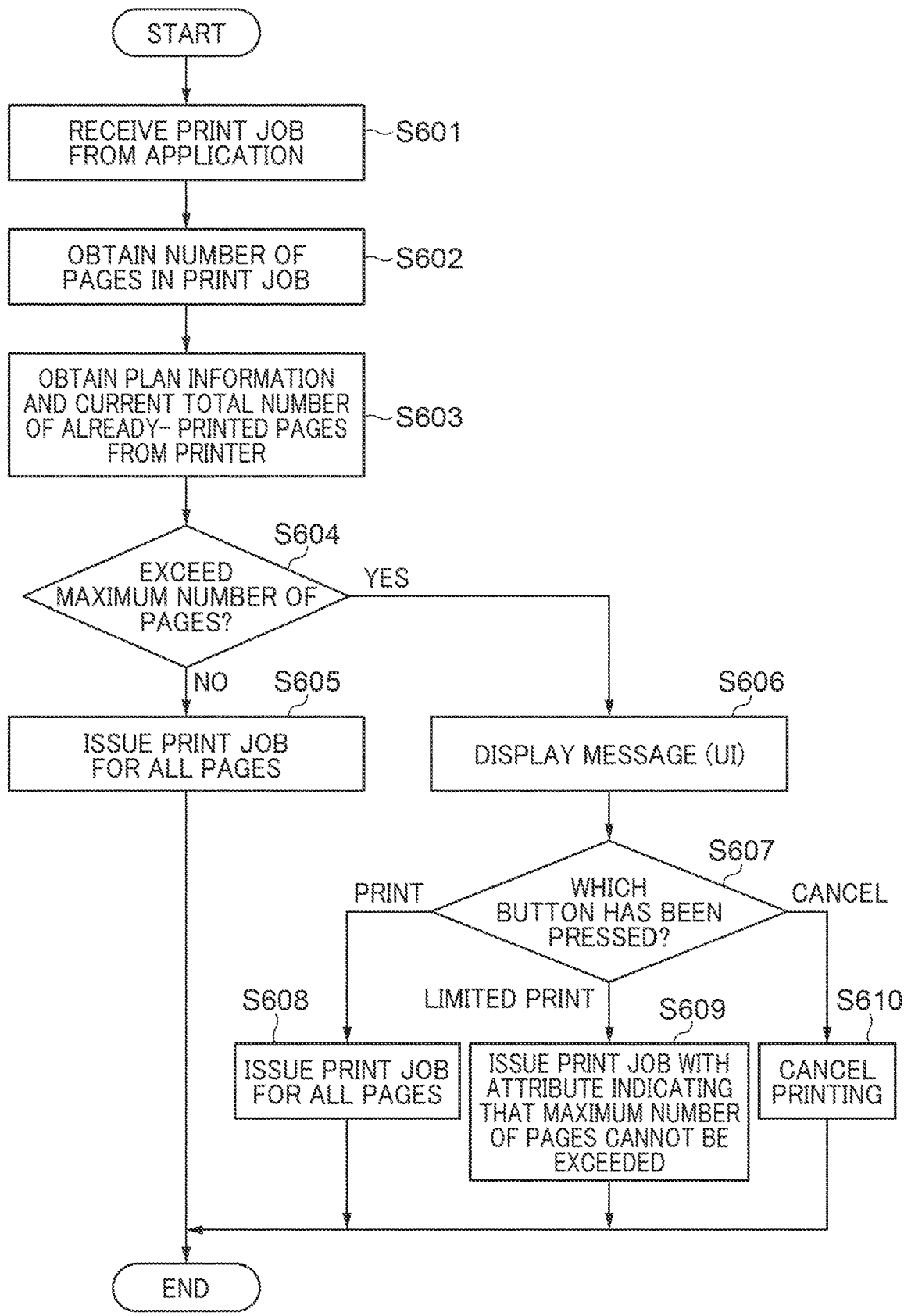
FIG. 6 is a flowchart of a processing performed by a printer driver in the first embodiment.

FIG. 6 is a flowchart of a processing executed by the printer driver 312 during printing in the first embodiment. Respective processes (respective steps) indicated by S numbers in the flowchart of FIG. 6 are realized by loading the printer driver 312 stored in the storage unit 203 of the computer 100 into the memory 212 and executing it by the CPU 211. In addition, the flowchart of FIG. 6 is executed when printing is instructed after opening a screen of the printer driver 312 from the application 301 such as Microsoft Word and accepting the print settings.

As shown in FIG. 6, in S601, the printer driver 312 receives a print job from the application 301 via the GDI 311. In S602, the printer driver 312 obtains the number of pages in the print job received in S601. For example, in the case that the application 301 is a type of application that transmits the number of pages and the number of pages is received from the application 301, the number of pages to be printed (the number of printing sheets) is obtained based on the number of pages received from the application 301 and the print settings (single-sided/double-sided and aggregated layout). On the other hand, in the case that the application 301 is a type of application that does not transmit the number of pages, the number of pages to be printed is obtained by analyzing image data received from the application 301 and based on the print settings.

In S603, the printer driver 312 obtains plan information for the current subscription contract and the total number of already-printed pages from the printer 120 via the network 140. The total number of already-printed pages includes the number of pages already printed by the printer 120 to date.

It should be noted that the plan information is the plan names of the current plan and the next plan, the monthly maximum numbers of pages of the current plan and the next plan, and the fees of the current plan and the next plan, and is used as the plan information 502 when the process of S606 is executed later and the UI 500 is displayed.

In S604, the printer driver 312 adds the number of pages in the print job obtained in S602 to the current total number of already-printed pages obtained in S603, and determines whether or not executing this print job will exceed the maximum number of pages of the current plan (determines whether or not the maximum number of pages of the current plan will be exceeded in the case of executing this print job). In the case that the printer driver 312 determines that the maximum number of pages of the current plan will not be exceeded (NO in S604), the printer driver 312 executes the process of S605, and on the other hand, in the case that the printer driver 312 determines that the maximum number of pages of the current plan will be exceeded (YES in S604), the printer driver 312 executes the process of S606.

In 605, the printer driver 312 converts the print job for all designated pages into PDL, transmits the print job to the printer 120 via the spooler 313, and then ends the processing shown in the flowchart of FIG. 6. In S606, the printer driver 312 displays the UI 500 shown in FIG. 5 on the display unit 201, and waits for an input operation performed by the user. In S607, the printer driver 312 confirms which button has been selected (pressed) among the print button 511, the limited print button 512, and the cancel button 513. In the case of determining that the print button 511 has been pressed, the printer driver 312 executes the process of S608. Furthermore, in the case of determining that the limited print button 512 has been pressed, the printer driver 312 executes the process of S609. Moreover, in the case of determining that the cancel button 513 has been pressed, the printer driver 312 executes the process of S610.

In S608, the printer driver 312 issues a print job, in which print data of all designated pages is converted into PDL, and then ends the processing shown in the flowchart of FIG. 6. It should be noted that issuing a print job refers to generating a print job and transmitting it to the printer 120. In S609, the printer driver 312 issues a print job, to which an attribute indicating that "the maximum number of pages cannot be exceeded" has been attached (hereinafter, referred to as "a print job with an attribute indicating that the maximum number of pages cannot be exceeded"). It should be noted that "the maximum number of pages cannot be exceeded" means that PDL for all pages is generated for the printer 120 and pages exceeding the maximum number of pages cannot be printed. After that, the printer driver 312 ends the processing shown in the flowchart of FIG. 6. It should be noted that the handling of the print job with the attribute indicating that the maximum number of pages cannot be exceeded will be described below. In S610, the printer driver 312 cancels printing, that is, does not transmit the print job to the printer 120. After that, the printer driver 312 ends the processing shown in the flowchart of FIG. 6.

Figure 7:
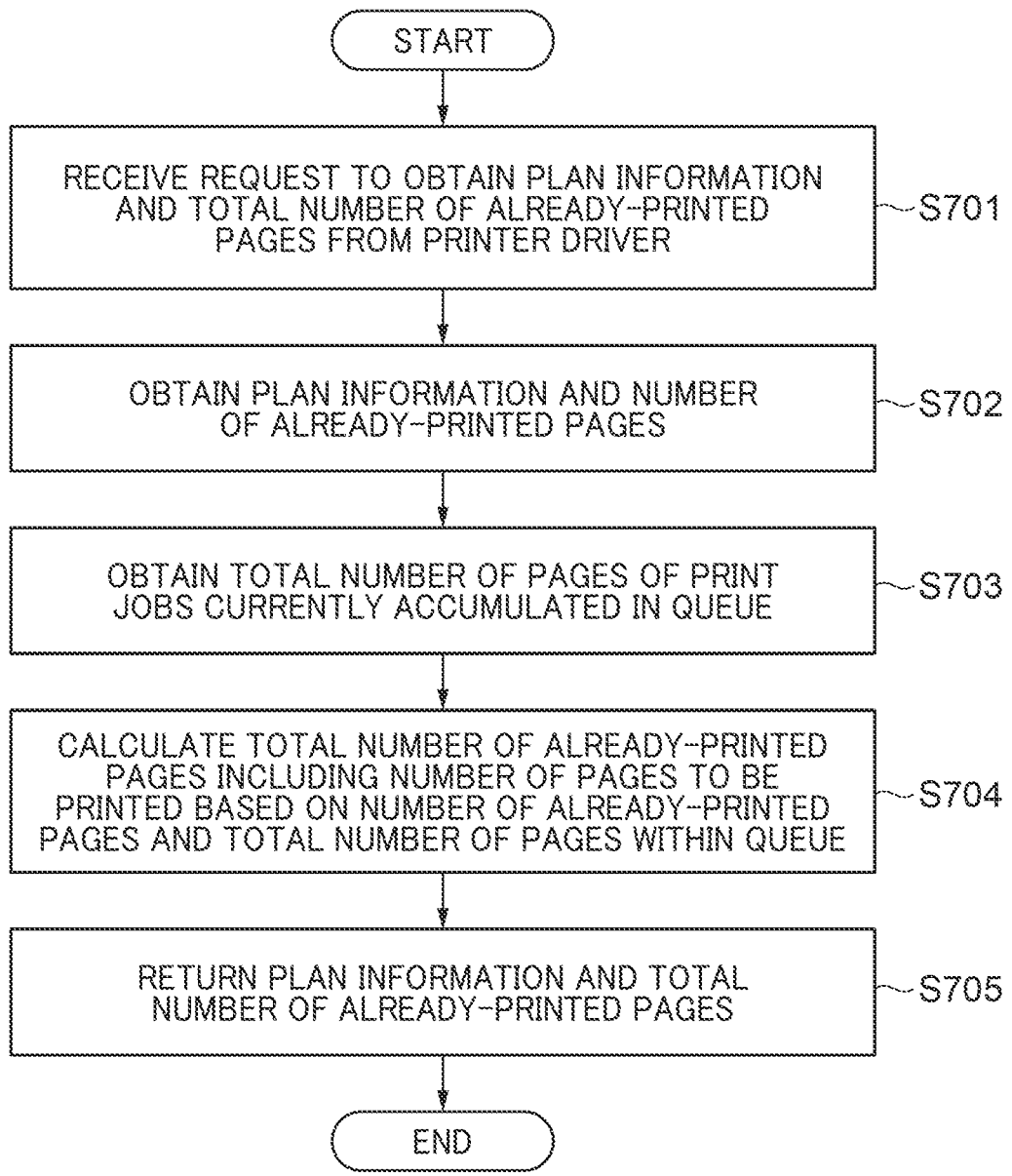
FIG. 7 is a flowchart of a response processing performed by the printer with respect to an information obtaining request.

FIG. 7 is a flowchart of a response processing performed by the printer 120 with respect to an information obtaining request (S603) from the printer driver 312. Processes (steps) indicated by S numbers in the flowchart of FIG. 7 are realized by loading the software stored in the storage unit 243 into the memory 252 and executing it by the CPU 251.

As shown in FIG. 7, in S701, the control unit 244 receives a request to obtain the plan information and the total number of already-printed pages from the printer driver 312. This corresponds to the printer 120 receiving an inquiry from the printer driver 312 through the process of S603. In S702, the control unit 244 obtains the plan information of the current plan and the number of pages already printed to date. It should be noted that the plan information is information regarding the plan name, the maximum number of pages, and the fee of the current plan selected from the plan table shown in FIG. 4, and this information is stored in the storage unit 243 of the printer 120. Furthermore, the number of pages already printed to date is a cumulative number of pages printed by the printer 120 from the first day of the month to the present (from the first day of the month to date), and is stored in the storage unit 243. It should be noted that the number of already-printed pages is updated every time printing is performed.

In S703, the control unit 244 obtains a total number of pages of the current print jobs accumulated in a print queue. The print queue is an area in the storage unit 243 in which print jobs that are scheduled to be printed but have not yet been listed. Normally, in the case that print jobs are accumulated in the print queue, a subsequently received print job is listed at the end of the print queue and is executed after all the accumulated print jobs are completed.

In S704, the control unit 244 calculates the total number of already-printed pages, which is the number of already-printed pages including the number of pages that are scheduled to be printed based on the obtained number of already-printed pages and the total number of pages of the print jobs accumulated in the print queue. It should be noted that in the case that no print job is accumulated in the print queue, the total number of already-printed pages obtained in S704 is the number of already-printed pages obtained in S702.

In S705, the control unit 244 returns the plan information obtained in S702 and the total number of already-printed pages calculated in S704 to the printer driver 312 of the computer 100, and then ends the response processing shown in the flowchart of FIG. 7. In this way, by returning the total number of already-printed pages that also takes the number of pages that are scheduled to be printed into account to the computer 100, the printer driver 312 becomes able to more accurately make the determination in S604.

Figure 8:
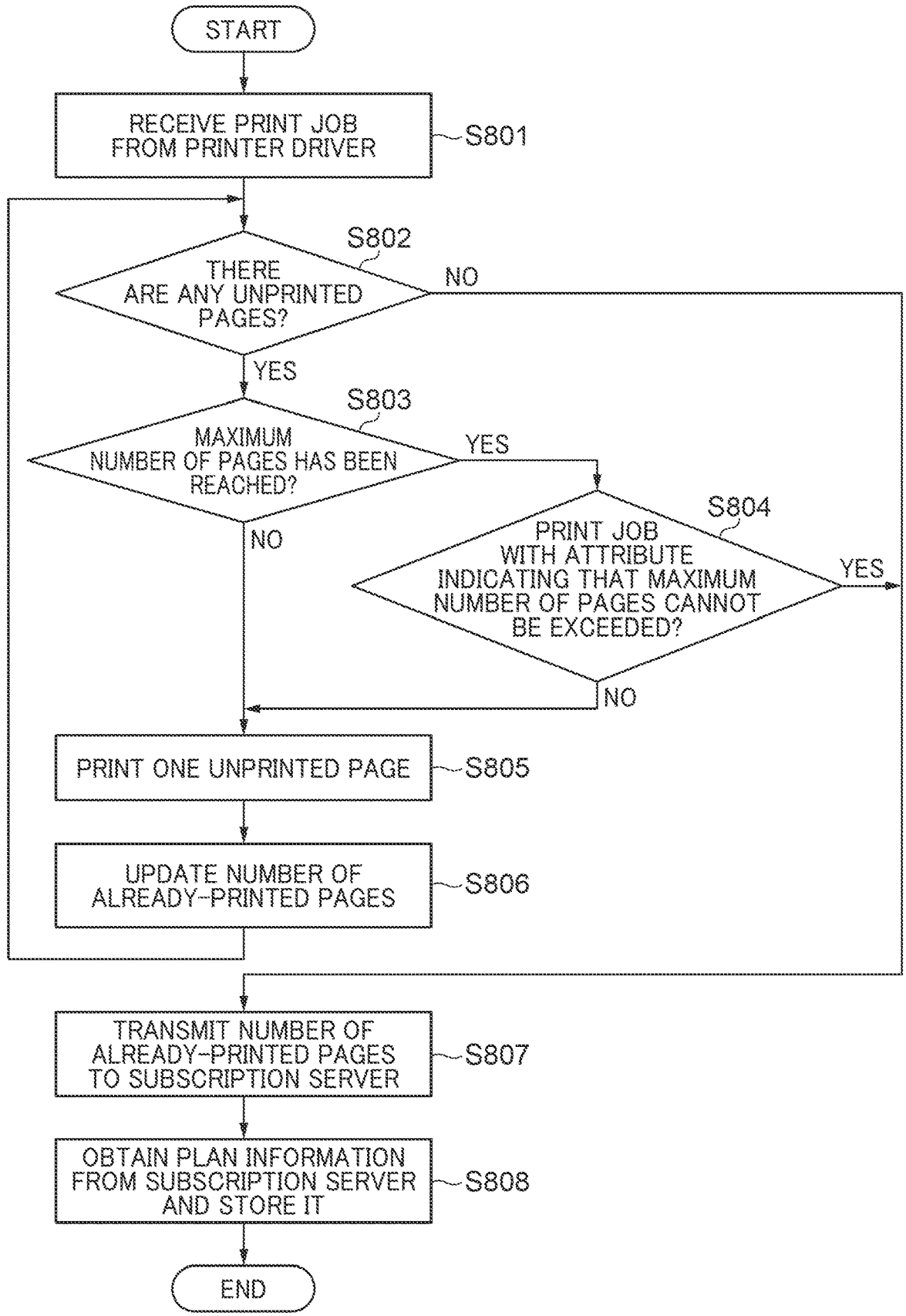
FIG. 8 is a flowchart of a print processing executed by the printer in the first embodiment.

FIG. 8 is a flowchart of a print processing executed by the printer 120 in the first embodiment. Processes (steps) indicated by S numbers in the flowchart of FIG. 8 are realized by loading the software stored in the storage unit 243 into the memory 252 and executing it by the CPU 251.

As shown in FIG. 8, in S801, the control unit 244 receives the print job from the printer driver 312. Here, it is assumed that no print job is accumulated in the print queue. In S802, the control unit 244 confirms (determines) whether or not there are any unprinted pages in the received print job. In the case that the control unit 244 determines that there are unprinted pages in the received print job (YES in S802), the control unit 244 executes the process of S803, and on the other hand, in the case that the control unit 244 determines that there are no unprinted pages in the received print job (NO in S802), the control unit 244 executes the process of S807.

In S803, the control unit 244 determines whether or not the number of pages already printed to date has reached the maximum number of pages in the current subscription plan. In the case that the control unit 244 determines that the number of pages already printed to date has reached the maximum number of pages in the current subscription plan (YES in S803), the control unit 244 executes the process of S804, and on the other hand, in the case that the control unit 244 determines that the number of pages already printed to date has not reached the maximum number of pages in the current subscription plan (NO in S803), the control unit 244 executes the process of S805.

In S804, the control unit 244 determines whether or not the print job received in S801 is the print job with the attribute indicating that the maximum number of pages cannot be exceeded. In the case that the control unit 244 determines that the print job received in S801 is the print job with the attribute indicating that the maximum number of pages cannot be exceeded (YES in S804), the control unit 244 executes the process of S807 without performing printing of the unprinted pages. On the other hand, in the case that the control unit 244 determines that the print job received in S801 is not the print job with the attribute indicating that the maximum number of pages cannot be exceeded (NO in S804), the control unit 244 executes the process of S805. In S805, the control unit 244 prints only one unprinted page of the print job. Then, in S806, the control unit 244 increments the number of already-printed pages stored in the storage unit 243 (adds 1 to the number of already-printed pages stored in the storage unit 243), updates and stores the incremented number of already-printed pages, and then executes the process of S802.

In S807, the control unit 244 finishes printing and transmits the number of already-printed pages stored in the storage unit 243 to the subscription server 130. In S808, the control unit 244 requests the subscription server 130 to transmit the plan information of the current plan, obtains the plan information of the current plan (in the case that printing exceeding the maximum number of pages is performed, plan information after plan change) from the subscription server 130, and stores it in the storage unit 243.

In this way, in the case that the printer 120 has received a print job based on pressing the print button 511 of the UI 500 from the computer 100, the printer 120 prints all pages, and in the case that the printer 120 has received a print job based on the limited print button 512 of the UI 500 from the computer 100, the printer 120 is able to perform printing without exceeding the maximum number of pages.

Figure 9:
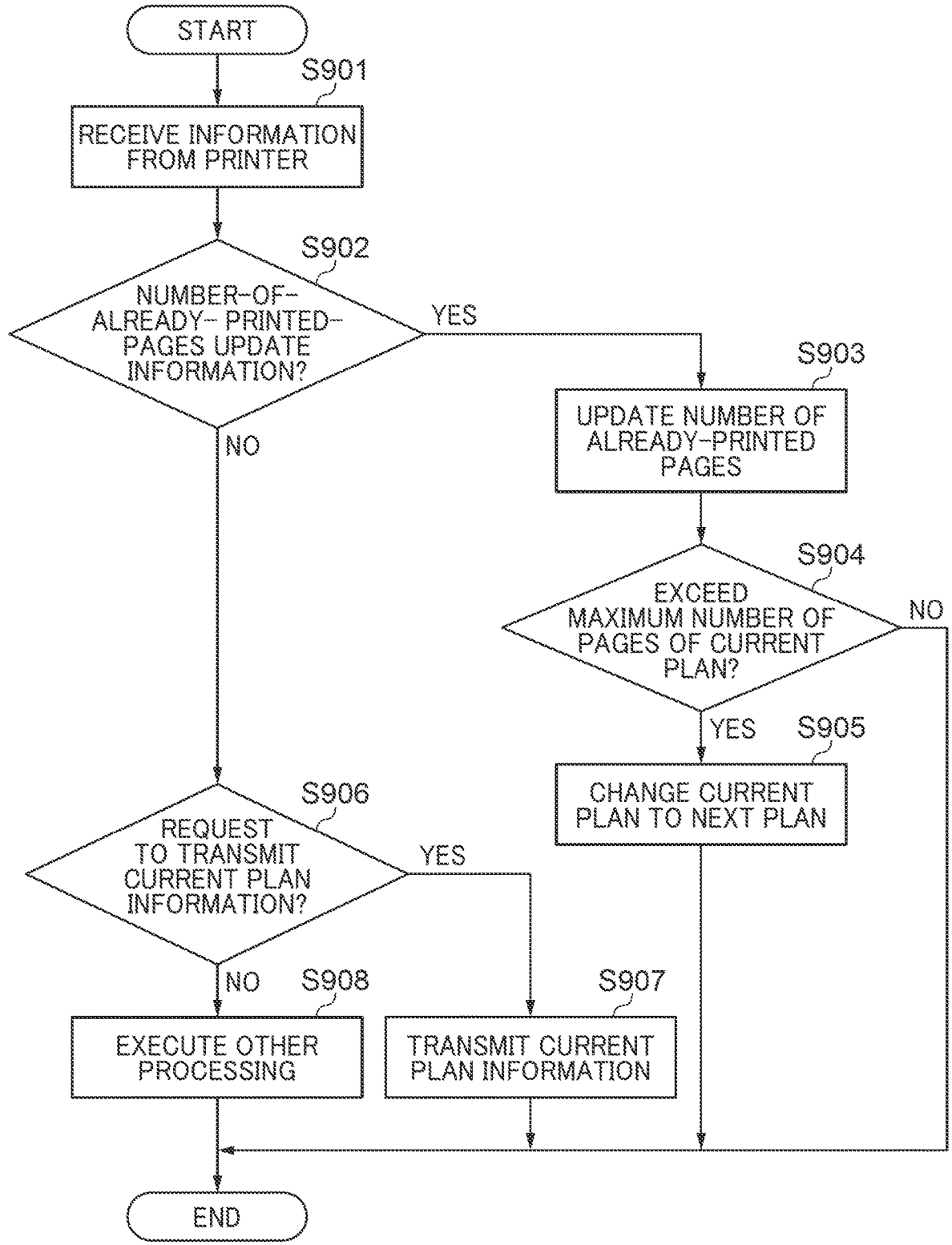
FIG. 9 is a flowchart of a processing executed by the subscription server based on information from the printer in the first embodiment.

FIG. 9 is a flowchart of a processing executed by the subscription server 130 when the subscription server 130 obtains information from the printer 120. Processes (steps) indicated by S numbers in the flowchart of FIG. 9 are realized by loading the software stored in the storage unit 223 into the memory 232 and executing it by the CPU 231.

As shown in FIG. 9, in S901, the control unit 224 receives predetermined information from the printer 120. In S902, the control unit 224 determines whether or not the content of the received information is update information for the number of already-printed pages. In other words, the control unit 224 determines whether or not the information received in S901 is the information obtained by the process of S807 of the flowchart of FIG. 8. In the case that the control unit 224 determines that the content of the received information is the update information for the number of already-printed pages (YES in S902), the control unit 224 executes the process of S903, and on the other hand, in the case that the control unit 224 determines that the content of the received information is not the update information for the number of already-printed pages (NO in S902), the control unit 224 executes the process of S906.

In S903, the control unit 224 updates the number of already-printed pages stored in the storage unit 223, which corresponds to the printer 120 that has transmitted the information in S901, with the value received in S901. Next, in S904, the control unit 224 determines whether or not the number of already-printed pages updated in S903 exceeds the maximum number of pages in the current subscription plan contracted for the printer 120 that has transmitted the information in S901. It should be noted that it is assumed that the plan information of each subscription plan and the current plan contracted for the printer 120 are also stored in the storage unit 223. In the case that the control unit 224 determines that the number of already-printed pages updated in S903 exceeds the maximum number of pages in the current subscription plan contracted for the printer 120 that has transmitted the information in S901 (YES in S904), the control unit 224 executes the process of S905, and on the other hand, in the case that the control unit 224 determines that the number of already-printed pages updated in S903 does not exceed the maximum number of pages in the current subscription plan contracted for the printer 120 that has transmitted the information in S901 (NO in S904), the control unit 224 ends the processing shown in the flowchart of FIG. 9.

In S905, the control unit 224 changes the subscription plan for the printer 120 that has transmitted the information in S901 from the current plan to the next plan, and then ends the processing shown in the flowchart of FIG. 9. For example, in the case that the contracted subscription plan is the plan 3 in the plan table shown in FIG. 4, when the number of already-printed pages exceeds 500, the contracted subscription plan is changed to the plan 4, which is the next plan. As a result, in the case that printing exceeding the maximum number of pages of the current plan is performed, it becomes possible to automatically update to the next plan.

In S906, the control unit 224 determines whether or not the information received in S901 is a request to transmit the plan information. In other words, whether or not a request to transmit the plan information of the current plan from the printer 120 through the process of S808 in the flowchart of FIG. 8 has been accepted is determined. In the case that the control unit 224 determines that the information received in S901 is the request to transmit the plan information (YES in S906), the control unit 224 executes the process of S907, and on the other hand, in the case that the control unit 224 determines that the information received in S901 is not the request to transmit the plan information (NO in S906), the control unit 224 executes the process of S908.

In S907, the control unit 224 takes out the plan information of the printer 120 that has transmitted the information in S901 from the storage unit 223, transmits it to the printer 120, and then ends the processing shown in the flowchart of FIG. 9. In S908, the control unit 224 executes processing with respect to any other request received in S901 that is neither the update of the number of already-printed pages nor the request to transmit the plan information, and then ends the processing shown in the flowchart of FIG. 9. It should be noted that the other processing executed in S908 have no direct relation to the present invention, and therefore their description will be omitted.

As described above, according to the present embodiment, in the case that the sum of the total number of already-printed pages and the number of pages in the print job obtained in S602 exceeds the maximum number of pages of the current plan, the UI 500 including the print button 511 and the cancel button 513 is displayed on the display unit 201. The print button 511 is the button for instructing to execute printing after allowing the shifting from the current plan to the next plan, that is, the button for instructing to transmit the print job that causes the printer 120 to execute printing exceeding the maximum number of pages. With the above configuration, the user becomes able to choose whether or not to perform printing exceeding the maximum number of pages before printing is executed even by allowing the change of the subscription plan, and it is possible to enhance the convenience when using the printer subscription service.

In addition, in the present embodiment, the UI 500 further displays the explanation 501 that calls attention to the fact that if you perform printing with the current settings, your contracted plan will be shifted to the next subscription plan, and the plan information 502 for the current plan and the next plan. As a result, it is possible to make it easier for the user to decide whether or not to perform printing exceeding the maximum number of pages even by allowing the change of the subscription plan.

In addition, in the present embodiment, the UI 500 further includes the limited print button 512. The limited print button 512 is the button for instructing to transmit the print job that causes the printer 120 to execute printing of the predetermined number of pages among all pages included in the instruction received from the user. It should be noted that the sum of the predetermined number of pages and the total number of already-printed pages matches the maximum number of pages. By displaying the UI 500 including such a limited print button 512, it is possible to provide the user with the option of performing printing without exceeding the maximum number of pages.

Figure 10:
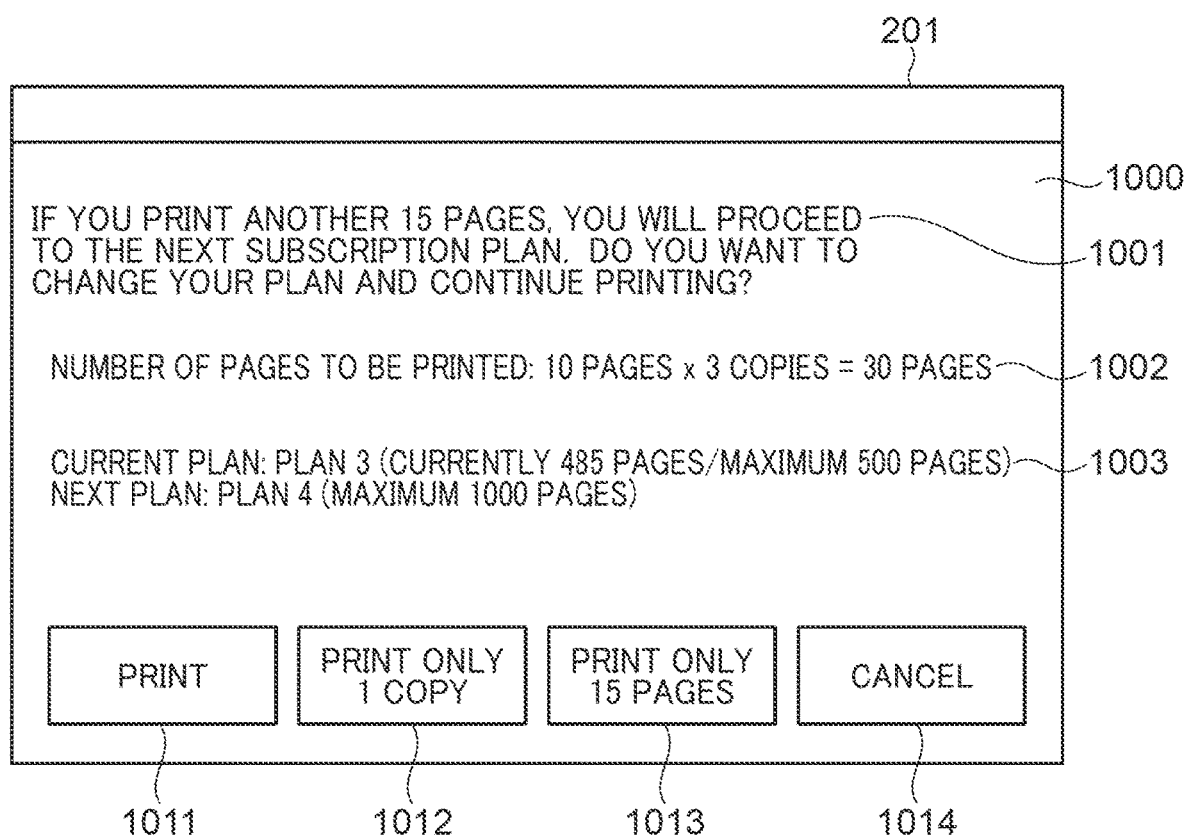
FIG. 10 is a diagram that shows another example of the UI displayed on the display unit of the computer.

It should be noted that the UI 500 shown in FIG. 5 is an example of a UI that is displayed in the case that there is a high possibility of shifting from the current plan to the next plan, and the example of the UI in such a case is not limited to the UI 500. FIG. 10 is a diagram that shows another UI 1000 that the printer driver 312 displays on the display unit 201 in the case that there is a high possibility of shifting from the current plan to the next plan.

The UI 1000 includes an explanation 1001 that calls attention to the fact that if you perform printing with the current settings, your contracted plan will be shifted to the next subscription plan, a print job content 1002 displaying the number of pages scheduled to be printed, and plan information 1003 for the current plan and the next plan. In this example, an example is shown in which printing of multiple copies is performed, and one of four options can be selected from the explanation 1001, the print job content 1002, and the plan information 1003. Therefore, the UI 1000 includes a print button 1011, a first limited print button 1012, a second limited print button 1013, and a cancel button 1014 that accept a selection from the user.

The user can recognize from the content of the explanation 1001 that if performing printing exceeding 15 pages, the subscription plan will be changed to the next plan. The print job content 1002 represents the number of pages per copy in the print job that is about to be performed, the number of copies to be printed, and the total number of pages to be printed. The plan information 1003 is similar to the plan information 502, and represents the plan name, the maximum number of pages, and the number of pages printed to date that are shown in FIG. 4. It should be noted that although the plan information 1003 does not display the fees for respective plans, they may be displayed.

In the case that the user wants to perform printing of all copies with allowing the change from the current plan to the next plan, the user only has to press (select) the print button 1011. Further, in the case that the user wants to perform printing of only one copy (10 pages) when the change from the current plan to the next plan is not allowed, the user only has to press (select) the first limited print button 1012. On the other hand, in the case that the user wants to use up to the maximum number of pages within the current plan, the user only has to press (select) the second limited print button 1013. The user can also cancel the print job by pressing the cancel button 1014.

In this way, the printer driver 312 may be configured to obtain the number of pages from the print job from the application 301 and provide a plurality of print patterns (print options) to the user. In the case that the first limited print button 1012 has been pressed, or in the case that the second limited print button 1013 has been pressed, the printer driver 312 internally changes the number of copies to be printed or the number of pages to be printed, and then executes the print processing. The processing of the printer driver 312 at this time can be performed by using existing (publicly known) technology, and therefore the description thereof will be omitted.

Next, the second embodiment will be described. In the first embodiment, the case has been described in which when printing exceeding the maximum number of pages of the subscription plan under contract is performed, the subscription plan is automatically shifted to the next plan. On the other hand, in the second embodiment, the case will be described in which when printing exceeding the maximum number of pages of the subscription plan under contract is performed, plan change will not be made automatically and an additional fee will apply depending on the number of excess pages. Since the configuration of the printing system in the second embodiment is equivalent to the configuration of the printing system in the first embodiment and the hardware configurations of the respective apparatuses constituting the printing system in the second embodiment are also equivalent to the hardware configurations of the respective apparatuses constituting the printing system in the first embodiment, the descriptions thereof will be omitted.

FIG. 11 shows an example of a subscription plan for the printer in the second embodiment. As shown in FIG. 11, the plans A, B, C, and D are available as the subscription plan. The maximum numbers of pages for the plans A to D are the same as the maximum numbers of pages for the plans 1 to 4 of the subscription plan shown in FIG. 4, but the plans A to D and the plans 1 to 4 behave differently in the case that printing exceeding the maximum number of pages is performed. That is, in the plans A to D, in the case that printing exceeding the maximum number of pages is performed, the subscription plan under contract will not be automatically changed to the next plan, and an additional fee of 150 yen will be applied for every 10 pages printed. The user can perform printing exceeding the maximum number of pages of the current plan just by paying a slightly higher additional fee depending on the number of pages exceeding the maximum number of pages of the current plan.

Figure 12:
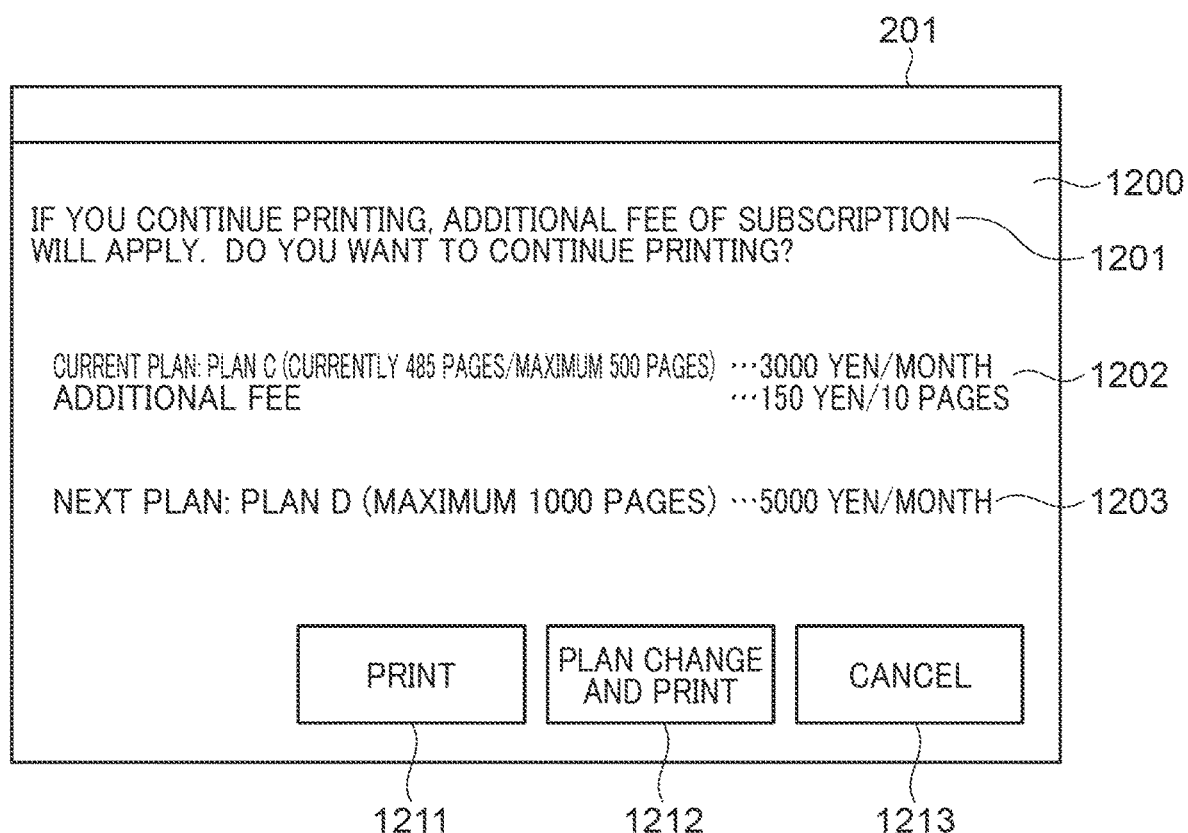
FIG. 12 is a diagram that shows an example of a UI displayed on the display unit of the computer in the second embodiment.

FIG. 12 is a diagram that shows a UI 1200 that the printer driver 312 displays on the display unit 201 in the second embodiment in the case that printing all the pages of the print job will exceed the maximum number of pages of the current plan.

The UI 1200 includes an explanation 1201 that calls attention to the fact that an additional fee will be applied when printing all the pages of the print job, and first plan information 1202 indicating the plan information of the current plan and the additional fee when printing all the pages of the print job. In addition, in order to enable printing after changing from the current plan to the next plan, the UI 1200 includes second plan information 1203 indicating the plan information of the next plan.

The UI 1200 further includes a print button 1211, a plan change and print button 1212, and a cancel button 1213 that accept a selection from the user. The print button 1211 is a button for instructing to perform printing of all the pages of the print job by paying an additional fee. The plan change and print button 1212 is a button for instructing to perform printing of all the pages of the print job by changing from the current plan to the next plan without paying an additional fee for excess pages. The cancel button 1213 is a button for instructing to cancel transmitting the print job to the printer 120.

Figure 13:
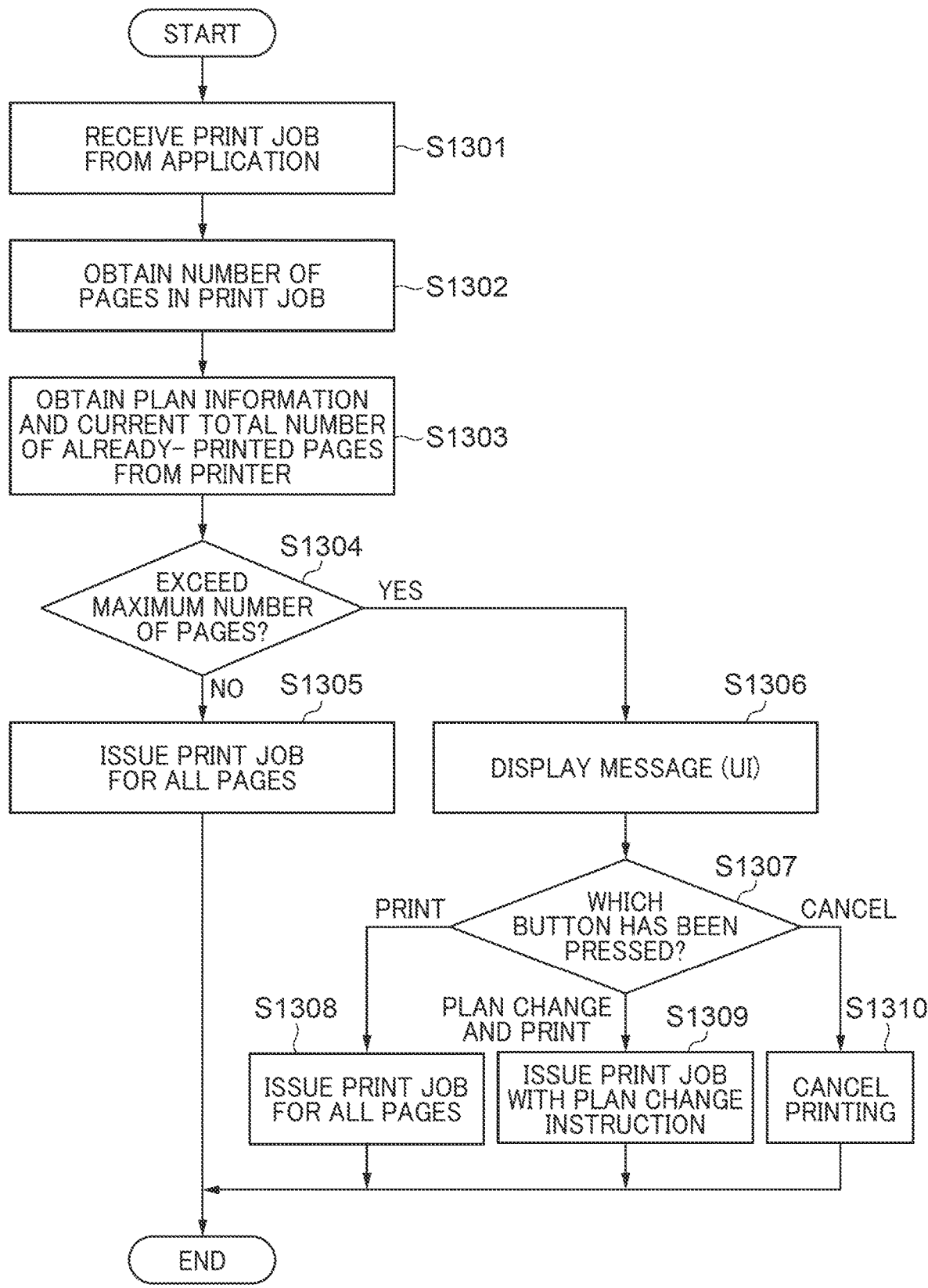
FIG. 13 is a flowchart of a processing performed by the printer driver in the second embodiment.

FIG. 13 is a flowchart of a processing executed by the printer driver 312 during printing in the second embodiment. Respective processes (respective steps) indicated by S numbers in the flowchart of FIG. 13 are realized by loading the printer driver 312 stored in the storage unit 203 of the computer 100 into the memory 212 and executing it by the CPU 211. It should be noted that the flowchart of FIG. 13 is similar to the flowchart of FIG. 6 described above, and hereinafter, in particular, contents that are different from the flowchart of FIG. 6 will be described. Similar to the flowchart of FIG. 6, the flowchart of FIG. 13 is executed when printing is instructed after opening a screen of the printer driver 312 from the application 301 such as Microsoft Word and accepting the print settings.

Since the respective processes of S1301 to S1307 and S1310 are the same as the respective processes of S601 to S607 and S610 shown in the flowchart of FIG. 6, the description thereof will be omitted here. It should be noted that a message (a UI) displayed on the display unit 201 in S1306 is the UI 1200 shown in FIG. 12.

In the case of determining in S1307 that the print button 1211 has been pressed, the printer driver 312 executes the process of S1308. In S1308, the printer driver 312 issues a print job, in which print data of all the pages is converted into PDL, and then ends the processing shown in the flowchart of FIG. 13. In this case, the additional fee for the excess pages will be charged.

In the case of determining in S1307 that the plan change and print button 1212 has been pressed, the printer driver 312 executes the process of S1309. In S1309, the printer driver 312 issues a print job in which print data of all the pages is converted into PDL and to which a plan change instruction has been attached, and then ends the processing shown in the flowchart of FIG. 13. It should be noted that the handling of the print job to which the plan change instruction has been attached will be described below.

Figure 14:
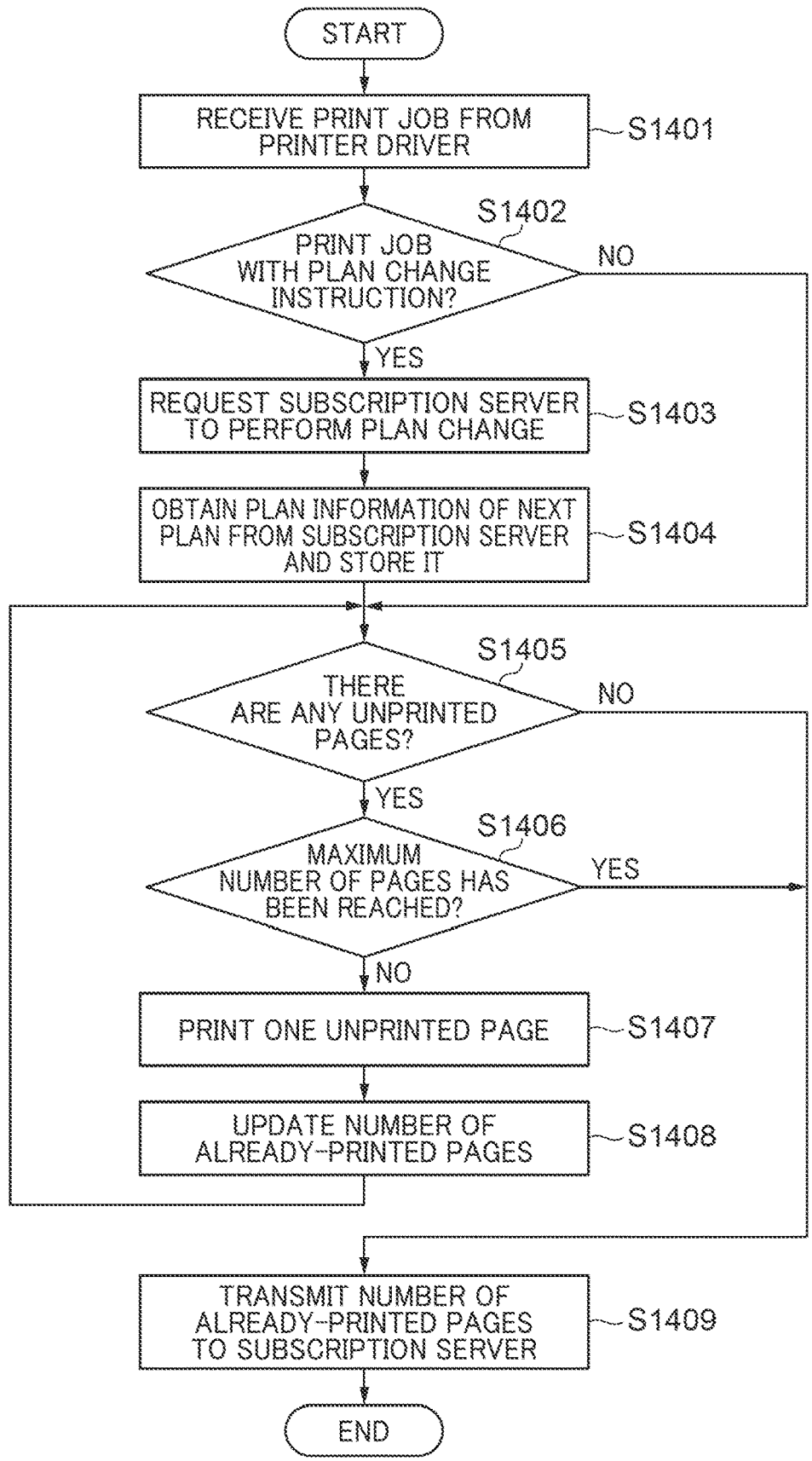
FIG. 14 is a flowchart of a print processing executed by the printer in the second embodiment.

FIG. 14 is a flowchart of a print processing executed by the printer 120 in the second embodiment. Processes (steps) indicated by S numbers in the flowchart of FIG. 14 are realized by loading the software stored in the storage unit 243 into the memory 252 and executing it by the CPU 251. It should be noted that the flowchart of FIG. 14 is similar to the flowchart of FIG. 8 described above, and hereinafter, in particular, contents that are different from the flowchart of FIG. 8 will be described.

As shown in FIG. 14, in S1401, the control unit 244 receives the print job from the printer driver 312. Here, it is assumed that no print job is accumulated in the print queue of the printer 120. In S1402, the control unit 244 determines whether or not the plan change instruction has been attached to the received print job. In other words, the control unit 244 confirms whether or not the print job issued by the printer driver 312 in S1309 has reached the printer 120 in S1401. In the case that the control unit 244 determines that the plan change instruction has been attached to the received print job (YES in S1402), the control unit 244 executes the process of S1403, and on the other hand, in the case that the control unit 244 determines that the plan change instruction has not been attached to the received print job (NO in S1402), the control unit 244 executes the process of S1405.

In S1403, the control unit 244 requests the subscription server 130 to change the subscription plan from the current plan to the next plan. Then, in S1404, the control unit 244 obtains plan information after plan change (the plan information of the next plan) from the subscription server 130, stores it in the storage unit 243, and then executes the process of S1405.

Since the respective processes of S1405, S1406, S1407, S1408, and S1409 are the same as the respective processes of S802, S803, S805, S806, and S807 that have been described with reference to the flowchart of FIG. 8, the description thereof will be omitted. It should be noted that although the process of S804 is executed in the case that the determination in S803 is YES, the process of S1409 is executed in the case that the determination in S1406 is YES. By executing the process of S1409, the print processing shown in the flowchart of FIG. 14 ends.

Figure 15:
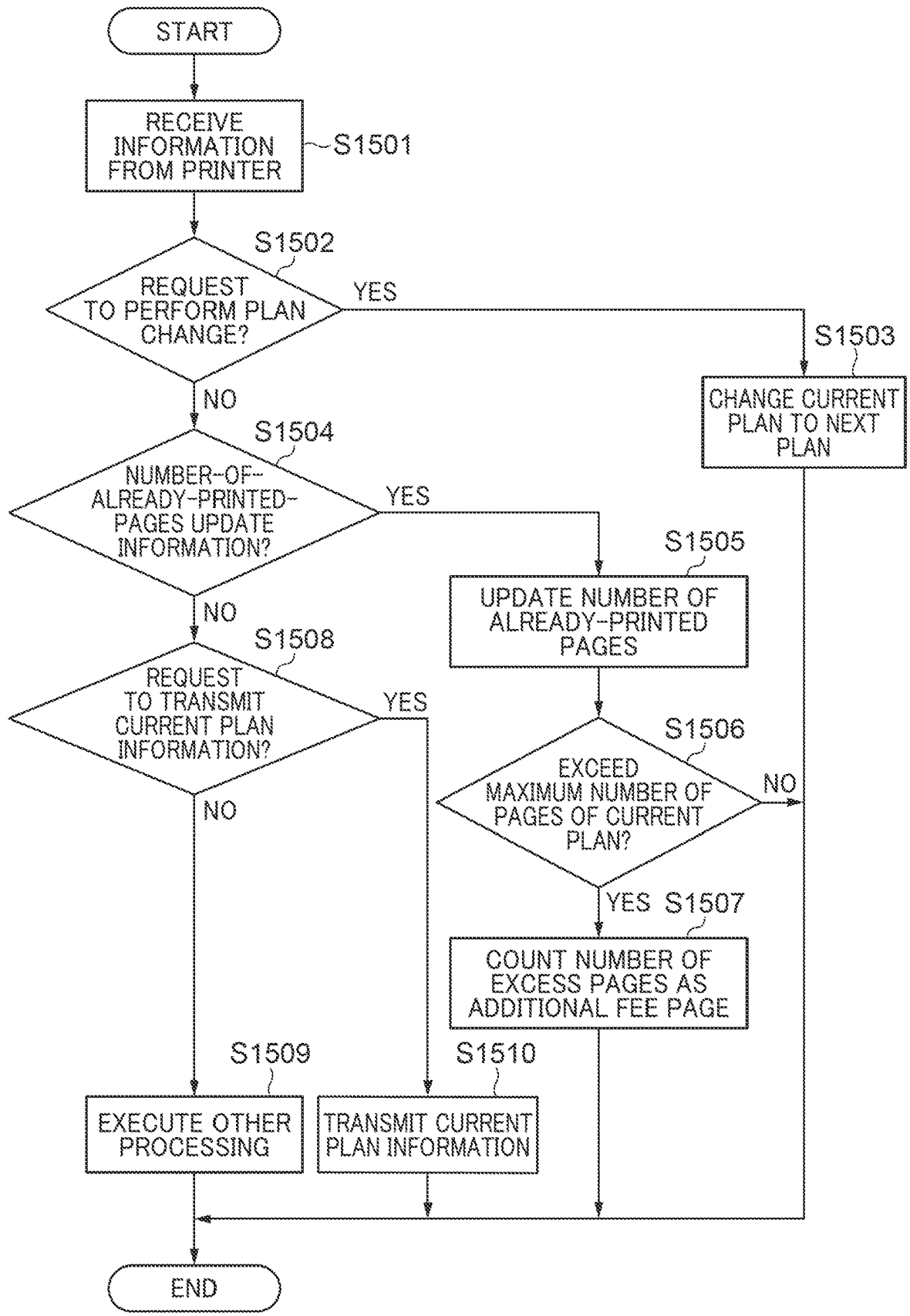
FIG. 15 is a flowchart of a processing executed by the subscription server based on information from the printer in the second embodiment.

FIG. 15 is a flowchart of a processing executed by the subscription server 130 when the subscription server 130 obtains information from the printer 120 in the second embodiment. Processes (steps) indicated by S numbers in the flowchart of FIG. 15 are realized by loading the software stored in the storage unit 223 into the memory 232 and executing it by the CPU 231. It should be noted that the flowchart of FIG. 15 is similar to the flowchart of FIG. 9 described above, and hereinafter, in particular, contents that are different from the flowchart of FIG. 9 will be described.

As shown in FIG. 15, in S1501, the control unit 224 receives predetermined information from the printer 120. In S1502, the control unit 224 determines whether or not the content of the received information is a request to change the subscription plan from the current plan to the next plan (hereinafter, referred to as "a plan change request"). In other words, the control unit 224 determines whether or not the information received in S1501 is the information obtained by the process of S1403 of the flowchart of FIG. 14. In the case that the control unit 224 determines that the content of the received information is the plan change request (YES in S1502), the control unit 224 executes the process of S1503, and on the other hand, in the case that the control unit 224 determines that the content of the received information is not the plan change request (NO in S1502), the control unit 224 executes the process of S1504.

In S1503, the control unit 224 updates the current plan, which is stored in the storage unit 223 as information corresponding to the printer 120 that has transmitted the information in S1501, to the next plan and stores it, and then ends the processing shown in the flowchart of FIG. 15.

The determination process of S1504, and the processes of S1505 and S1508 that are executed based on the determination result of the determination process of S1504 are the same as the processes of S902, S903, and S906 that are shown in the flowchart of FIG. 9, respectively, and therefore the description thereof will be omitted here. In addition, the processes of S1509 and S1510 that are executed based on the result of the determination process of S1508 are the same as the processes of S908 and S907 that are shown in the flowchart of FIG. 9, respectively, and therefore the description thereof will be omitted here.

In S1506 executed following S1505, the control unit 224 determines whether or not the number of already-printed pages updated in S1505 exceeds the maximum number of pages in the current subscription plan contracted for the printer 120 that has transmitted the information in S1501. It should be noted that it is assumed that the plan information of each subscription plan (see FIG. 11) and the current plan contracted for the printer 120 are stored in the storage unit 223. In the case that the control unit 224 determines that the number of already-printed pages updated in S1505 exceeds the maximum number of pages in the current subscription plan contracted for the printer 120 that has transmitted the information in S1501 (YES in S1506), the control unit 224 executes the process of S1507, and on the other hand, in the case that the control unit 224 determines that the number of already-printed pages updated in S1505 does not exceed the maximum number of pages in the current subscription plan contracted for the printer 120 that has transmitted the information in S1501 (NO in S1506), the control unit 224 ends the processing shown in the flowchart of FIG. 15.

In S1507, the control unit 224 counts the number of excess pages as additional fee pages for the printer 120 (counts the number of excess pages as subject to an additional fee for the printer 120), and then ends the processing shown in the flowchart of FIG. 15. For example, in the case that the current plan is the plan C and the number of already-printed pages exceeds 500, the number of excess pages (=the number of already-printed pages-500) will be counted as additional fee pages. As a result, in the case that printing exceeding the maximum number of pages of the current plan is performed, the user only has to pay an additional fee corresponding to the number of excess pages.

As described above, in the second embodiment, in the case that changing from the current plan to the next plan is not allowed, the user is able to select and print the desired number of pages. In addition, in the case of performing printing exceeding the maximum number of pages of the current plan, the user is able to immediately select whether to perform printing by paying an additional fee for the number of excess pages exceeding the maximum number of pages of the current plan, or to perform printing by updating the current plan to the next plan, and then is able to execute the print job. In this way, it is possible to enhance the convenience when using the subscription service of the printer 120.

In addition, in the second embodiment, the UI 1200 includes the explanation 1201 that calls attention to the fact that an additional fee will be applied when printing of all the pages of the print job is performed, and the first plan information 1202 indicating the additional fee when printing of all the pages of the print job is performed. As a result, it is possible to make it easier for the user to decide whether or not to perform printing of all the pages of the print job even by paying an additional fee.

Although the present invention has been described above in detail based on its preferred embodiments, the present invention is not limited to these specific embodiments, and the present invention also includes various forms without departing from the gist of the invention. Further, each of the embodiments described above is merely one embodiment of the present invention, and each embodiment can be combined as appropriate.

For example, a part of the operations described in the above-described embodiments as operations of the printer driver 312 within the computer 100 may be executed by a dedicated application. In this case, the dedicated application resides in the computer 100 and monitors print jobs, and in the case that the issuance of the print job of the subscription plan is detected, performs the processing corresponding to the flowchart of FIG. 6 and the processing corresponding to the flowchart of FIG. 13.

The transmission and reception of data between the computer 100, the printer 120, and the subscription server 130 can be realized without using the above configuration. For example, in the above-described embodiments, although the printer driver 312 is configured to obtain the plan information of the current plan and the number of already-printed pages from the printer 120, the present invention is not limited thereto, and these pieces of information may be obtained from the subscription server 130.

Furthermore, in the above-described embodiments, although the configuration, in which the UI 500, the UI 1000, and the UI 1200 are displayed on the display unit 201 of the computer 100 that transmits the print job to the printer 120, has been described, the present invention is not limited to this configuration. For example, the UI 500, the UI 1000, and the UI 1200 may be displayed on the display unit 241 of the printer 120 that has received a copy instruction issued by the user's operation of the operation unit 242 of the printer 120. In the case of causing the display unit 241 of the printer 120 to display these UIs, for example, these UIs are displayed on the display unit 241 after all set documents have been read. Alternatively, the number of pages of a document to be copied is measured, whether or not the measured number of pages is less than a predetermined value is determined, and the display control of these UIs is performed based on the result of this determination. For example, in the case that the measured number of pages is less than the predetermined value, whether or not the maximum number of pages is exceeded is determined each time one page of the document is read, and when the maximum number of pages is exceeded, these UIs are displayed on the display unit 241. On the other hand, in the case that the measured number of pages is equal to or greater than the predetermined value, whether or not the maximum number of pages is exceeded is determined after all set documents have been read, and when the maximum number of pages is exceeded, these UIs are displayed on the display unit 241. By controlling in this way, even with a configuration in which the user issues a copy instruction from the operation unit 242 of the printer 120, the same effects as in the above-described embodiments can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025960, filed on Feb. 22, 2023, which is hereby incorporated by reference herein in its entirety.

What is claimed is:

1. A non-transitory computer-readable storage medium storing a program for causing a computer to execute a control method for an information processing apparatus that transmits a print job, which causes to execute a print processing according to an instruction issued by a user, to an image forming apparatus, which restricts the number of printed pages based on a contracted plan, the control method comprising:
obtaining a total number of already-printed pages including the number of pages already printed to date by the image forming apparatus;
obtaining, by the information processing apparatus that transmits the print job to the image forming apparatus, a number of pages included in the print job; and causing, in a case that a sum of the total number of already-printed pages and the number of pages included in the print job exceeds a threshold value corresponding to the contracted plan, a display unit of the information processing apparatus to display a user interface including a first object for instructing to transmit a print job that causes the image forming apparatus to execute a print processing exceeding the threshold value, and a second object for instructing to cancel transmitting the print job to the image forming apparatus.

2. The non-transitory computer-readable storage medium according to claim 1, wherein
the user interface further includes a third object for instructing to transmit a print job that causes the image forming apparatus to execute a print processing of a predetermined number of pages among all pages included in the instruction, for which a sum of the predetermined number of pages and the total number of already-printed pages matches the threshold value.

3. The non-transitory computer-readable storage medium according to claim 1, wherein
the user interface further includes a fourth object for instructing to transmit a print job that causes the image forming apparatus to execute a print processing of a predetermined number of pages among all pages included in the instruction, for which a sum of the predetermined number of pages and the total number of already-printed pages is less than the threshold value.

4. The non-transitory computer-readable storage medium according to claim 1, wherein
the control method further comprises issuing the print job, and
in a case that the first object is selected by the user, in the issuing, a print job designating all pages included in the instruction is issued.

5. The non-transitory computer-readable storage medium according to claim 1, wherein
information of the contracted plan, information of another plan with less restriction on the number of printed pages than the contracted plan, and information indicating that the contracted plan will be changed to the another plan if the print processing is performed according to the instruction are further displayed on the user interface.

6. The non-transitory computer-readable storage medium according to claim 5, wherein
in a case that the first object is selected, the contracted plan is changed to the another plan.

7. The non-transitory computer-readable storage medium according to claim 1, wherein
information indicating that an additional fee will be applied if the print processing is performed according to the instruction and information indicating the additional fee are further displayed on the user interface.

8. The non-transitory computer-readable storage medium according to claim 7, wherein
in a case that the first object is selected, the number of pages exceeding the threshold value is counted as subject to the additional fee.

9. The non-transitory computer-readable storage medium according to claim 1, wherein
the total number of already-printed pages further includes a total number of pages of print jobs waiting to be printed.

10. The non-transitory computer-readable storage medium according to claim 1, wherein the control method further comprises obtaining, by the information processing apparatus that transmits the print job to the image forming apparatus, the sum of the total number of already-printed pages and the number of pages included in the print job.

11. An information processing apparatus that transmits a print job, which causes to execute a print processing according to an instruction received from a user, to an image forming apparatus, which restricts the number of printed pages based on a contracted plan,
the information processing apparatus comprising:
a display unit;
at least one processor; and
a memory coupled to the at least one processor and storing instructions that, when executed by the at least one processor, cause the at least one processor to function as:
an obtaining unit that obtains (i) a total number of already-printed pages including the number of pages already printed to date by the image forming apparatus and (ii) a number of pages included in the print job; and
a display control unit that causes, in a case that a sum of the total number of already-printed pages and the number of pages included in the print job exceeds a threshold value corresponding to the contracted plan, the display unit to display a user interface including a first object for instructing to transmit a print job that causes the image forming apparatus to execute a print processing exceeding the threshold value, and a second object for instructing to cancel transmitting the print job to the image forming apparatus.

12. A control method for an information processing apparatus that transmits a print job, which causes to execute a print processing according to an instruction issued by a user, to an image forming apparatus, which restricts the number of printed pages based on a contracted plan,
the control method comprising:
obtaining a total number of already-printed pages including the number of pages already printed to date by the image forming apparatus;
obtaining, by the information processing apparatus that transmits the print job to the image forming apparatus, a number of pages included in the print job; and
causing, in a case that a sum of the total number of already-printed pages and the number of pages included in the print job exceeds a threshold value corresponding to the contracted plan, a display unit of the information processing apparatus to display a user interface including a first object for instructing to transmit a print job that causes the image forming apparatus to execute a print processing exceeding the threshold value, and a second object for instructing to cancel transmitting the print job to the image forming apparatus.

* * * * *